Dec. 5, 1933. R. V. GRAYSON 1,938,522
DEAERATING FREEZING PROCESS AND APPARATUS THEREFOR
Filed Dec. 20, 1930
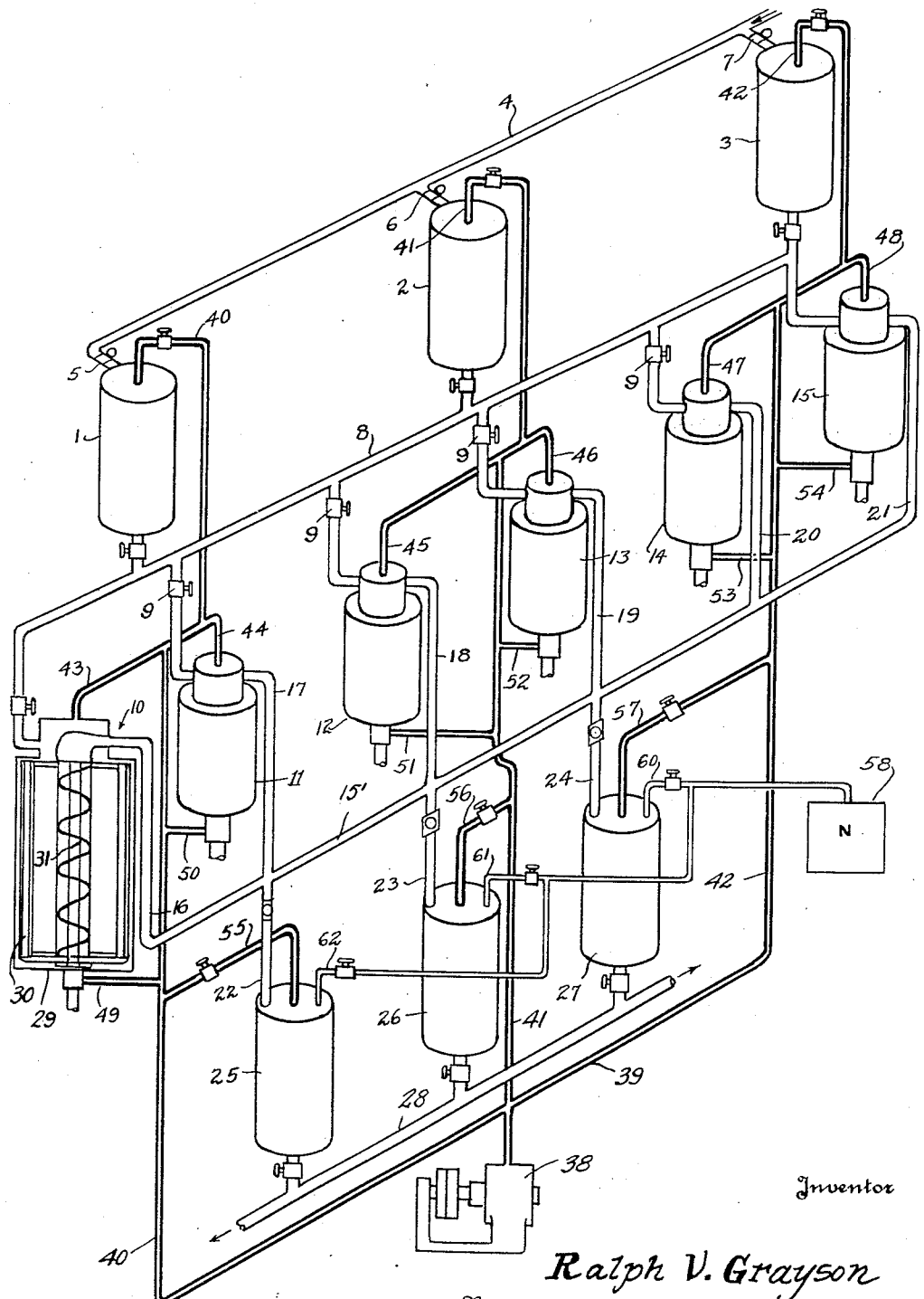
Inventor
Ralph V. Grayson
By Mason Fenwick & Lawrence
Attorneys Patented Dec. 5, 1933

1,938,522

UNITED STATES PATENT OFFICE 1,938,522

DEAERATING FREEZING PROCESS AND APPARATUS THEREFOR

Ralph V. Grayson, Atlanta, Ga., assignor of fifty per cent to E. G. Ballenger, C. M. Foster, and F. M. Bird, all of Atlanta, Ga., as organizers of Refrigeration Patents and Processes, Inc., a corporation to be organized under the laws of Georgia Application December 20, 1930
Serial No. 503,828

2 Claims. (Cl. 62—114)

This invention relates to a freezing process for the preparation of liquids for packaging the same and while it has a potentially broad application to liquids of many types, it is particularly adapted to the treatment of citrus fruit juices and will be described in this connection throughout the following specification.

One of the objects of the invention, based upon the principle that it is oxidation which deteriorates the flavor of packaged fruit juices, is to so handle the juice throughout the process of preparation that it is not only kept isolated from air, but it is at the same time relieved of absorbed or entrained air or oxygen.

Another object of the invention is the freezing of the fruit juice in vacuo whereby not only is the incorporation of air with the juice, "overrun" as it is known in the ice cream industry, avoided, but such agitation of the juice as takes place in the freezing step brings extended surfaces of the juice under the influence of the vacuum and so abstracts from the juice the entrained or absorbed air.

A further object of the invention is the provision of a mechanical system by means of which the process of the invention may be carried out.

Other objects of the invention will appear as the following description of a preferred and practical embodiment thereof proceeds.

In the drawing, the sole figure represents diagrammatically, the lay-out of a system by which the process of the present invention may be practiced, and it also represents the combinative relation of such structural elements as are embraced in the mechanical aspect of the invention.

Before adverting to a detailed description of the figure, it may be stated that the cause of citrus fruit juices, and particularly orange juice, going flat is oxidation in one form or another, as by direct chemical reaction, biological organisms, or oxidase enzymes. In cooking processes of juice preservation, the juice is rendered sterile and much of the absorbed oxygen is driven off, but the advantages of de-aeration are more than off-set by the breaking down of certain of the flavoring principles due to heating of the juice.

The freezing process as ordinarily carried out avoids destructive heating of the flavors but makes no attempt at de-aeration. In fact, the agitation of the juices during freezing entrains additional air into the juices and since freezing does not stop chemical action or the action of the enzymes, oxidation goes on with consequent detriment to the quality of the flavor.

The present process by isolating the juice from the air and by abstracting from the juice the entrained and absorbed air, prevents oxidation and therefore maintains the flavor of the raw juice unimpaired.

Referring now in detail to the drawing, the reference characters 1, 2 and 3 represent a plurality of reservoirs forming a battery and receiving juice through conduit 4 and valved branch pipes 5, 6 and 7 opening into reservoirs adjacent the top. The conduit 4 leads from a source of supply such as a juice extractor, and after a vacuum precooling process has been employed such as is disclosed in my application Serial No. 492,533, filed October 31, 1930, the juice enters the reservoirs 1, 2 and 3, already isolated from air and reasonably free from entrained or absorbed air. However, the present process is not necessarily dependent upon a vacuum precooling step and the juice may come through the conduit 4 direct from a juice extractor without any provisions having been made for air exclusion.

Each of the reservoirs as shown in the diagram is designed to supply a pair of freezers although since the reservoirs all connect into a common distributing pipe 8, the juice may be directed into any one of the entire series of freezers 10, 11, 12, 13 and 14 by proper manipulation of the valves 9 in the branch pipes which connect the distributing pipe 8 with the freezers.

In the operation of the system as shown it is designed that one of the reservoirs shall be discharging into one or more of the freezers at the same time that another of the reservoirs is being filled from the juice extractor. The third reservoir, it is assumed, has already been filled and is awaiting its turn next to be discharged into the distributing pipe.

As will presently be shown, the reservoirs are all connected to an exhaust system so that the valve between the juice supply pipe 4 and such reservoir as may be discharging will be closed during the discharge period of that reservoir to prevent the introducing of air into the evacuated space within said reservoir.

It will be shown that the freezers into which the juice from the reservoirs discharges are under the same degree of vacuum so that there is no impediment to the gravital discharge of the reservoirs 1, 2 and 3, into the distribution conduit 8.

All the freezers discharge into a common discharge pipe 15' to which they are connected by branches 16, 17, 18, 19, 20 and 21. The discharge pipe 15' empties by way of valve branches 22, 23 and 24 into exhaust tanks 25, 26 and 27, which in turn are connected by suitable valve controlled conduits to a discharge pipe 28. The capacity of the freezers is such that two of them will fill one of the exhaust tanks. However by appropriate manipulation of the valves in the branches 16 to 21 and the branches 22 to 24, the contents of any freezer may be diverted into any one or more of the exhaust tanks.

The freezers may be of the type specifically illustrated and described in my companion application Serial No. 503,829, filed December 20, 1930, each consisting as diagrammatically illustrated in the figure of an outer jacket 29 forming the expansion chamber of a Carnot type cycle refrigeration system, (not shown), the jacket 29 surrounding a chamber against the walls of which revolve scrapers 30 suitably power driven. A central tubular elevator 31 also power driven is located in the freezing chamber. The juice which has been frozen into a slush by the time it has reached the open lower end of the tubular elevator 31 is raised by the elevator to the top of the freezing chamber, being more firmly frozen as it rises and it discharges by way of the branch pipes 16, 17, 18, 19, 20 and 21.

Since citrus fruit juices are composite in their nature having constitutents which may crystallize at different temperatures and having some constituents which may form a sedimentary cloud if permitted to separate, the mild agitation produced both by the scrapers 30 and the elevator 31 is essential in order that the juice shall be kept homogeneous during the freezing period.

A vacuum cycle is provided for the system comprising a vacuum pump designated by the reference character 38 having a manifold 39 with branches connecting into the top of each of the reservoirs 1, 2 and 3 as indicated by the numerals 40, 41 and 42 and connecting into both the top and bottom of all the freezers by way of branch pipes 43, 44, 45, 46, 47, 48, 49, 50, 51, 52, 53 and 54. The vacuum manifold also communicates with the upper portions of the exhaust tanks 25, 26 and 27 by branches 55, 56 and 57.

All of the connections of the vacuum cycle with the several reservoirs, the freezers and the exhaust tanks are controlled by suitable valves by means of which the vacuum may be cut on or off from any of the above named units. If it were not for the vacuous condition prevailing in the freezers, the mild agitation which is so necessary in order to produce homogeneity in the frozen product would inevitably entrain air or cause its absorption into the juice in much the same manner that the "over-run" is imparted to ice cream, thereby accentuating the amount of oxygen present in the juice, which is the very condition that the present invention seeks to remedy. By having a vacuum in the freezer, no air is incorporated into the juice by the agitation of the same, but on the contrary the mass of juice is broken up so as to present relatively large surfaces to the vacuous atmosphere in the freezer, by which means the entrained or absorbed air which may have entered into the freezer incorporated in the juice is abstracted therefrom.

It is obvious that since the reservoirs and the freezers are under the same degree of vacuum, a static sub-pressure exists in the reservoirs and freezers so that there is nothing to impede the flow of juice from the reservoirs into the freezers by gravity.

Since the freezers and the exhaust tanks are also under the same degree of sub-pressure, the contents of the freezers may discharge by gravity into the exhaust tanks.

The filling line however, will discharge into cans or receptacles at atmospheric pressure or possibly at some pressure under the atmospheric pressure which may be different from the degree of vacuum existing in the freezing system. Consequently, it is essential at the time of discharging the exhaust tanks, that the vacuum therein be substituted by an air free medium, the pressure of which may be that of the atmosphere. For convenience, and other practical reasons, nitrogen has been selected as this medium, and a nitrogen cycle has been provided for the three exhaust tanks which is diagrammatically represented in the present layout by a nitrogen tank 58 having a manifold 59 with valved branches 60, 61 and 62 communicating with the upper parts of the upper exhaust tanks. When it is desired to discharge any one of the exhaust tanks, the valve in the proper branch 22, 23 or 24 is closed, isolating the exhaust tank from the vacuum. Then the proper nitrogen valve is turned on and a pressure built up in the exhaust tank equal to or exceeding the pressure at the point of final discharge so that the discharge can take place either by gravity or under pressure. It is obvious that the use of nitrogen avoids the introduction of oxygen into the exhaust tanks, so that the juice is protected from aeration in any form in its course of travel throughout the freezing system.

While I have in the above diagram illustrated a form of the invention of fairly large capacity, it is to be understood that the invention can be exemplified in units of any size and that a single reservoir, freezer and exhaust tank can be made to carry out the invention quite as completely as the more complex lay-out herein described.

It is to be understood that the freezer may be of any type, the one herein specifically described being merely by way of example. It is also to be understood that the nitrogen cycle is not essential to the carrying out of the invention in its broadest aspect, and that any other means may be employed for discharging the exhaust tanks which will maintain the juice isolated from the atmospheric air during the discharge period.

What I claim is:

1. De-aeration freezing system for liquids comprising a reservoir, a freezer and a discharge tank in valved, serial communication in the order named, said discharge tank having a valve controlled atmospheric outlet, means for maintaining a vacuum in said freezer and discharge tank during the freezing period, means for admitting an oxygenless gas to said discharge tank, up to atmospheric pressure, to permit gravital discharge of its contents, and means for holding the vacuum in said freezer during the discharge period of said discharge tank.

2. Continuous de-aerating freezing system for liquids comprising a plurality of reservoirs, freezers and discharge tanks, means supplying liquid to said reservoirs, the latter communicating with said freezer by a common conduit and being adapted to be discharged successively into said conduit, said freezers being in valved communication with said conduit whereby they may be selectively filled, discharge tanks in valved communication with said freezers by a common conduit for selectively receiving the frozen contents of said freezers, a vacuum system including a vacuum pump leading from the eduction side thereof to said reservoirs, freezers and discharge tanks, the communication of said vacuum system with said reservoirs, freezers and discharge tanks being valve controlled, an oxygenless gas system including a source of such gas and a conduit from said source in valved communication with said discharge tanks, whereby the vacuum in said latter tanks can be replaced by an atmosphere of oxygenless gas and discharging the contents of said tanks.

RALPH V. GRAYSON.